United States Patent
Ikegami

[19]

[11] Patent Number: 5,815,517
[45] Date of Patent: Sep. 29, 1998

[54] METHOD AND APPARATUS FOR GENERATING SUPER HARD LASER

[75] Inventor: Hidetsugu Ikegami, Takarazuka, Japan

[73] Assignee: Japan Science and Technology Corporation, Japan

[21] Appl. No.: 796,524

[22] Filed: Feb. 6, 1997

[30] Foreign Application Priority Data

Feb. 19, 1996 [JP] Japan ..................... 8-030203

[51] Int. Cl.$^6$ ............................ H01S 3/00
[52] U.S. Cl. ............................ 372/2
[58] Field of Search ............ 372/69, 2; 315/3–5, 315/3.24

[56] References Cited

U.S. PATENT DOCUMENTS

| | | | |
|---|---|---|---|
| 3,879,679 | 4/1975 | Mourier | 372/2 |
| 4,482,843 | 11/1984 | Perring | 372/2 |
| 4,491,948 | 1/1985 | Deacon et al. | 372/2 |
| 4,975,917 | 12/1990 | Villa | 372/5 |
| 5,060,232 | 10/1991 | Etievant | 372/2 |

*Primary Examiner*—Leon Scott, Jr.
*Attorney, Agent, or Firm*—Lorusso & Loud

[57] ABSTRACT

In a method of generating a super hard laser, uniformization of the energy of an electron beam in an electron storage ring and formation of a pulse of the electron beam through gyration phase bunching are simultaneously performed so as to convert the stored electron beam into a coherent electron beam having a high degree of time coherence. A laser beam is projected in a direction opposite to the traveling direction of the coherent electron beam so as to induce coherent Compton scattering (CCS) of the laser beam. With this operation, a super hard laser such as a CCS X-ray or a CCS γ-ray can be generated.

8 Claims, 1 Drawing Sheet

METHOD AND APPARATUS FOR GENERATING SUPER HARD LASER

BACKGROUND OF THE INVENTION

Field of the Invention

The present invention relates to a method and apparatus for generating a super hard laser, which is a generic term including a CCS (Coherent Compton Scattering) X-ray and a CCS γ-ray, and more particularly to a method and apparatus for generating a coherent super hard laser that has a wavelength ranging from the region of soft X-rays whose photon energy is suitable for micro lithography and X-ray microscopes to the region of γ-rays having a possibility of controlling a nuclear reaction cross section.

The conventional technique for generating a coherent monochromatic light beam has been limited to the generation of light beams, such as a laser beam, in the visible light region and its neighboring regions. Moreover, there has not been realized a practical method for generating a super hard laser, such as an X-ray laser or a γ-ray laser; i.e., a coherent monochromatic light beam in the X-ray region or the γ-ray region in which the photon energy is equal to or greater than about 1 MeV.

Therefore, there has been desired a practical method of generating such a super hard laser.

SUMMARY OF THE INVENTION

An object of the present invention is to provide a method and apparatus for generating a super hard laser, such as an X-ray laser or a γ-ray laser, that is superior to synchrotron radiation (SR) light and a free electron laser (FEL) in terms of shortness of wavelength and economy, on the basis of a technique that is entirely different from any conventional technique for generating a coherent monochromatic light beam.

To achieve the above object, the present invention provides an improved method of generating a super hard laser. The method comprises the steps of: simultaneously performing uniformization of the energy of an electron beam in an electron storage ring and formation of pulses of the electron beam through gyration phase bunching so as to convert the stored electron beam into a coherent electron beam having a high degree of time coherence; and projecting a laser beam in a direction opposite to the traveling direction of the coherent electron beam so as to induce coherent Compton scattering of the laser beam.

In the present invention, cyclotron maser cooling (CMC) is applied to an electron storage ring in accordance with the technique proposed by the inventors of the present invention (Japanese Patent Application No. 6-326510, entitled "Method and Apparatus for Generating Coherent Charged Particle Beam"). Moreover, through uniformization of energy and formation of pulses by gyration phase bunching caused by the cyclotron maser cooling (CMC), a coherent electron beam having a high degree of time coherence is generated, and a laser beam is projected in a direction opposite to the traveling direction of the coherent electron beam so as to induce a coherent Compton scattering, whereby a super hard laser having an improved monochromatism, directivity and luminance is generated.

The present invention also provides an improved method of generating a super hard laser. The method comprises the steps of: forcing an electron beam in an electron storage ring to cause a cyclotron gyration motion; and applying to the electron beam a high frequency electromagnetic field of a TE mode having a frequency and a strength matched with the gyration motion so that uniformization of the energy of the electron beam and formation of a pulse through gyration phase bunching are simultaneously caused by cyclotron maser cooling (CMC) so as to convert the electron beam into a coherent electron beam having a high degree of time coherence, whereby Compton scattering of a laser beam projected onto the coherent electron beam becomes coherent.

Preferably, a solenoid magnetic field is introduced so as to correct the gyration phase, whereby the electron beam in the electron storage ring is made coherent more efficiently, and coherent Compton scattering is induced more efficiently by the laser beam.

The present invention further provides an improved apparatus for generating a super hard laser. The apparatus comprises an electron storage ring; and a resonator disposed in said electron storage ring and adapted to generate a uniform solenoid magnetic field and a high frequency electromagnetic field having a frequency and a strength matched with the solenoid magnetic field so as to simultaneously perform uniformization of the energy of the electron beam and formation of pulses through the gyration phase bunching, thereby generating a coherent electron beam capable of inducing coherent Compton scattering (CCS) of a laser beam.

The present invention further provides an improved apparatus for generating a super hard laser. The apparatus comprises an electron storage ring for storing an electron beam; a solenoid magnetic field generation section disposed along the electron beam; a high frequency resonator for cyclotron maser cooling that applies to the electron beam within said solenoid magnetic field generation section a high frequency electromagnetic field having a frequency and a strength matched, in TE mode, with the magnetic field with respect to the direction of the magnetic axis so as to simultaneously perform uniformization of the energy of the electron beam and formation of pulses through the gyration phase bunching; and means for generating a coherent electron beam by the cyclotron maser cooling, whereby a coherent super hard laser such as a coherent CCS X-ray or a coherent CCS γ-ray is generated due to the coherent Compton scattering (CCS) of a laser beam.

In the apparatuses for generating a super hard laser according to the present invention, a solenoid magnetic field is preferably introduced so as to correct the gyration phase, whereby the electron beam in the electron storage ring is made coherent more efficiently, and the coherent Compton scattering is induced more efficiently by the laser beam.

As described above, in the present invention, a solenoid for phase correction is provided in the storage ring for storing a coherent electron beam, if needed. This guarantees the coherence of the electron beam and the Compton scattering.

DESCRIPTION OF THE PREFERRED EMBODIMENT

Figure 1:
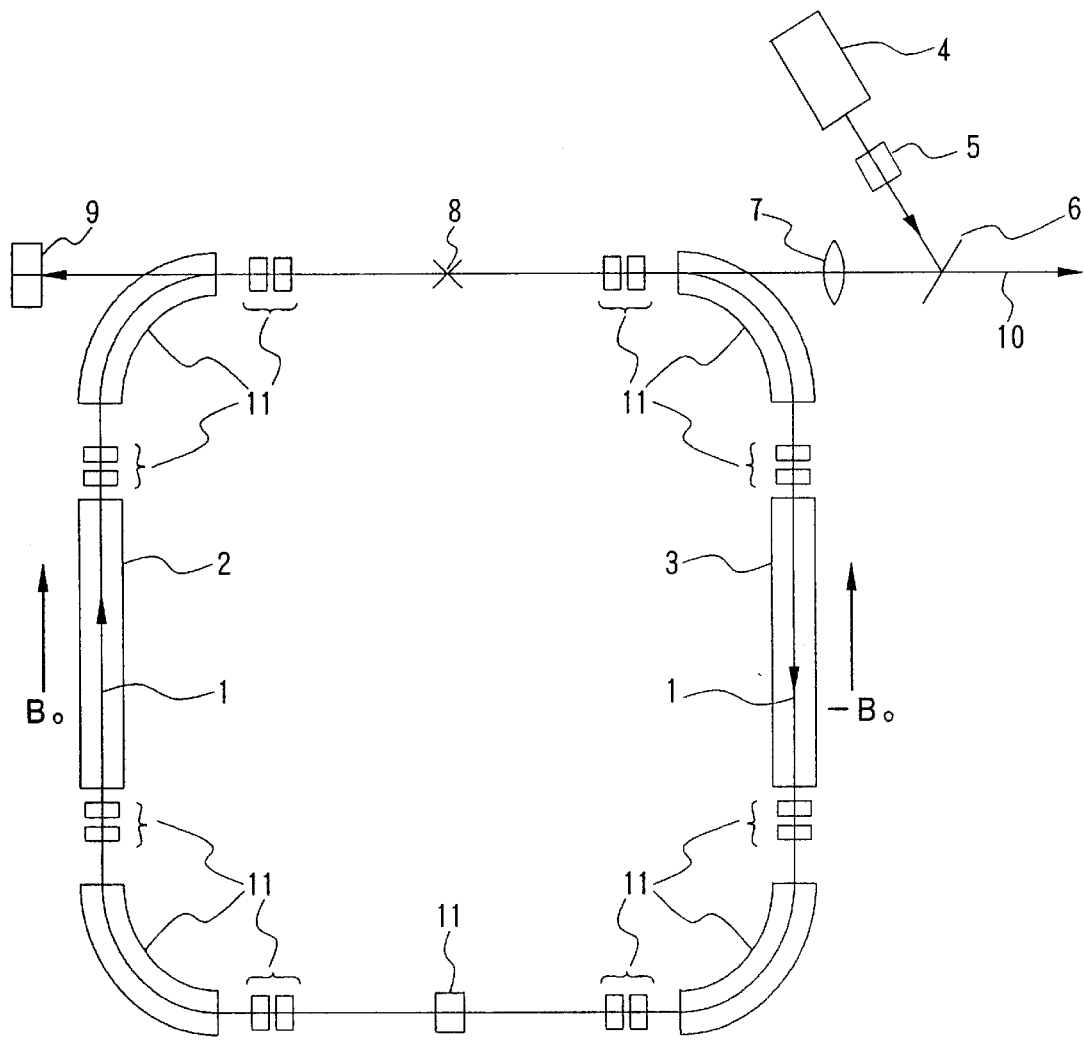
FIG. 1 is a schematic view of an apparatus for generating a super hard laser according to an embodiment of the present invention.

An embodiment of the present invention will now be described in detail.

In the case where the energy of photons that undergo Compton scattering is sufficiently smaller than the rest mass energy of a free electron $m_oc^2=511$ keV ($m_o$ is the rest mass of an electron, and c is the speed of light), Compton scattering can be regarded as Thomson scattering. Therefore, in such a case, Thomson's simple theory on a scattering mechanism can be applied to Compton scattering. Meanwhile, a group of electrons within a pulse (time width: $t_B$) of a coherent electron beam which is obtained by sufficient cooling by CMC and phase bunching are in the same phase and have thermal energy kT that satisfies the following equation called "Heisenberg's uncertainty relation":

$$kT \cdot t_B < h, \quad (1)$$

wherein k is Boltzmann's constant, T is an electron temperature, and h is Planck's constant.

During scattering of a group of coherent laser photons with a group of coherent electrons, the group of coherent electrons can be regarded as a group of electric dipoles aligned in the same phase in the traveling direction of the laser beam. Electric dipoles in the same phase radiate a group of photons that are in the same phase only in the common direction; i.e., coherent light. Therefore, the direction of scattering is allowed to be the same as the direction of the incident laser beam, or to be opposite to the direction of the laser beam.

Accordingly, coherent Compton scattering (CCS) light is a coherent photon beam having a sharp directivity almost equal to that of the incident laser beam.

The energy $h\nu'$ of a CCS photon radiated in the direction opposite to the direction of the incident laser beam; i.e., the same direction as the coherent electron beam, is increased by the Doppler effect as expressed by the following equation:

$$h\nu' \approx 4\gamma^2 h\nu$$

$$\gamma = E_e/m_oc^2, \quad (2)$$

wherein $\nu$ is the frequency of a photon before it undergoes Compton scattering, $\nu'$ is the frequency of the photon after it undergoes Compton scattering, $\gamma$ is a relativistic energy factor, and $E_e$ is the total energy of an electron.

Accordingly, as can be understood from Equation (2), the photon energy $h\nu'$ of a CCS photon that is obtained in the present invention can be freely changed by changing the photon energy $h\nu$ of the irradiation laser beam or the acceleration energy $(\gamma-1)m_oc^2$ of the electron.

The total cross section of an unpolarized laser photon scattering by electron random phases is given by:

$$\sigma_o = (8\pi/3)r_o^2$$

$$r_o = e^2/m_oc^2, \quad (3)$$

wherein $r_o$ is the classical electron radius, and e is an electron charge. By contrast, in scattering caused by a group of, for example, n electrons in the same phase, the n electrons in the same phase behave as a single charged particle having a charge of ne and a mass of $nm_o$, so that the scattering cross section becomes $n^2\sigma_o$. In other words, the scattering cross section is increased to n times the sum $n\sigma_o$ of the scattering cross section of n electrons that are in the random phases. Accordingly, the CCS photon is generated at an efficiency $10^3$–$10^6$ times that obtained in the case where an LCS γ-ray is generated by a usual laser Compton scattering (LCS), when the strength of the electron beam and the intensity of the incident laser beam are the same in both cases.

As can be understood from the above discussion, in addition to the feature of having a polarizability similar to that of an ordinary LCS -(ray (laser Compton scattering γ-ray), the CCS photon-ray of the present invention has a sharp directivity that is peculiar to a laser beam and that the LCS γ-ray does not have. Moreover, as compared with the LCS γ-ray, the CCS photon beam has a strength increased by a factor equal to the number of electrons subjected to phase bunching. Therefore, as will be described below, the present invention allows a small-sized electron storage ring to easily generate a coherent super hard laser having photon energy greater than that of a conventional huge photon radiation ring.

In relation to the present technique for generating -γ rays, generation of γ-rays having an intensity of $10^7$ photons/second has been reported in Japan, USA, and Europe. Therefore, in the case where the number of electrons that undergo phase bunching is equal to or greater than $10^6$, it is possible to generate a super hard laser having an intensity of $10^{13}$ photons/second. Also, the CCS photon beam has a directivity as described above. Therefore, the intensity of the CCS photon beam increases to a level that cannot be compared with that of the LCS γ-ray.

Next, an embodiment of the present invention will be described with reference to the drawing.

FIG. 1 shows a schematic view of an apparatus for generating a super hard laser in the region of X-rays, in which the present invention is applied to a small-sized CMC electron storage ring (accelerated electron energy: $(\gamma-1)m_oc^2=7$ MeV; i.e., $\gamma=15$).

In FIG. 1, numeral 1 denotes an electron beam, numeral 2 denotes a high-frequency resonator for CMC disposed in a solenoid magnetic field having a flux density of $B_o$, and numeral 3 denotes an auxiliary high-frequency resonator for CMC disposed in a correction solenoid magnetic field having a flux density of $-B_o$. Although the auxiliary high-frequency resonator 3 is depicted for general discussion, the auxiliary high-frequency resonator 3 is not essential in cases other than the case in which a super hard laser in the region of higher energy γ-rays is to be generated. Accordingly, in the present embodiment in which a super hard laser in the soft X-ray region is generated, the auxiliary high-frequency resonator 3 and the auxiliary solenoid magnetic field are not necessarily needed. Numeral 4 denotes an Nd:YAG laser source (wavelength: 1,064 nm), numeral 5 denotes a control section for controlling the degree of polarization of the laser beam, numeral 6 denotes a reflection mirror for reflecting the laser beam, numeral 7 denotes a focusing lens, numeral 8 denotes a collision point between the laser beam and the electron beam, numeral 9 denotes a monitor for monitoring the intensity of the laser beam, numeral 10 denotes a super hard laser having a wavelength of about 1 nm; i.e., photon energy of about 1 keV, and numeral 11 denotes particle optical elements such as electromagnets of the storage ring.

In the present embodiment, the energy of electrons lost at the collision point 8 is 1 keV at the most. Since the energy and focusability of the electrons are corrected by the auxiliary high-frequency acceleration or CMC of an acceleration mode in the ring, generation of the super hard laser does not result in loss of the electrons, so that the electron beam in the storage ring can be used repeatedly.

The present invention is not limited to the above-described embodiments. Numerous modifications and variations of the present invention are possible in light of the spirit of the invention, and they are not excluded from the scope of the present invention.

The present invention provides the following advantages:

(a) An electron beam in the electron storage ring is forced to cause gyration motion at the CMC section, and CMC is introduced so as to simultaneously perform formation of pulses of the electron beam by gyration phase bunching and uniformization of energy of the electron beam, thereby generating a coherent electron beam. A laser beam is projected in a direction opposite to the traveling direction of the electron beam so as to amplify the laser photon energy. Accordingly, a coherent super hard laser, such as a coherent X-ray or a coherent γ-ray can be generated.

(b) Unlike an LCS γ-(ray, a super hard laser generated due to CCS between a coherent electron beam and a laser beam has sharp directivity, monochromaticity, and coherence that are the same as those of the projected laser beam. Therefore, unlike the LCS γ-ray, kinematic focusing action is not required, and a super hard laser having a high intensity can be obtained even in the X-ray region in which the energy is low.

(c) Compared to a conventional LCS γ-ray, the efficiency in generating a super hard laser is increased by a factor equal to the number of electrons in a pulse subjected to phase bunching. Specifically, the super hard laser can be generated at an efficiency 103–106 times that in the case of an LCS γ-ray, when the strength of the electron beam and the intensity of the incident laser beam are the same in both cases.

(d) The apparatus of the present invention for generating a super hard laser is compact and can be constructed at a cost lower than that of the conventional photon radiation ring. Moreover, the apparatus of the present invention can generate a coherent photon beam in the region of high-energy γ-rays, which cannot be generated in accordance with conventional methods for generating photon radiation.

What is claimed is:

1. A method of generating a super hard laser, comprising the steps of:

simultaneously performing uniformization of the energy of an electron beam in an electron storage ring and formation of pulses of the electron beam through gyration phase bunching so as to convert the stored electron beam into a coherent electron beam having a high degree of time coherence; and projecting a laser beam in a direction opposite to the traveling direction of the coherent electron beam so as to induce coherent Compton scattering of the laser beam.

2. A method of generating a super hard laser, comprising the step of:

generating a coherent electron beam by cyclotron maser cooling in which a high frequency electromagnetic field is applied to an electron beam within a solenoid magnetic field generating section disposed along the electron beam in an electron storage ring, said high frequency electromagnetic field having a frequency and a strength matched, in TE mode, with the magnetic field with respect to the direction of the magnetic axis, so that uniformization of the energy of the electron beam and formation of pulses through gyration phase bunching are simultaneously performed, whereby a coherent super hard laser is generated due to coherent Compton scattering of a laser beam.

3. A method of generating a super hard laser according to claim 1, wherein a solenoid magnetic field is introduced so as to correct the gyration phase, whereby the electron beam in the electron storage ring is made coherent more efficiently, and coherent Compton scattering of the laser beam is induced more efficiently.

4. A method of generating a super hard laser according to claim 2, wherein a solenoid magnetic field is introduced so as to correct the gyration phase, whereby the electron beam in the electron storage ring is made coherent more efficiently, and coherent Compton scattering of the laser beam is induced more efficiently.

5. An apparatus for generating a super hard laser, comprising:

an electron storage ring;

means for simultaneously performing uniformization of the energy of an electron beam in an electron storage ring and formation of a pulse of the electron beam through gyration phase bunching so as to convert the stored electron beam into a coherent electron beam having a high degree of time coherence; and means for projecting a laser beam in a direction opposite to the traveling direction of the coherent electron beam so as to induce coherent Compton scattering of the laser beam.

6. An apparatus for generating a super hard laser, comprising:

an electron storage ring for storing an electron beam;

a solenoid magnetic field generation section disposed along the electron beam;

a high frequency resonator for cyclotron maser cooling that applies to the electron beam within said solenoid magnetic field generation section a high frequency electromagnetic field having a frequency and a strength matched, in TE mode, with the magnetic field with respect to the direction of the magnetic axis so as to simultaneously perform uniformization of the energy of the electron beam and formation of pulses through gyration phase bunching; and means for generating a coherent electron beam by the cyclotron maser cooling, whereby a coherent super hard laser is generated due to coherent Compton scattering of a laser beam.

7. An apparatus for generating a super hard laser according to claim 5, wherein a solenoid magnetic field is introduced so as to correct the gyration phase, whereby the electron beam in the electron storage ring is made coherent more efficiently, and coherent Compton scattering of the laser beam is induced more efficiently.

8. An apparatus for generating a super hard laser according to claim 6, wherein a solenoid magnetic field is introduced so as to correct the gyration phase, whereby the electron beam in the electron storage ring is made coherent more efficiently, and coherent Compton scattering of the laser beam is induced more efficiently.

* * * * *

UNITED STATES PATENT AND TRADEMARK OFFICE
CERTIFICATE OF CORRECTION

PATENT NO. : 5,815,517
DATED : September 29, 1998
INVENTOR(S) : IKEGAMI

It is certified that error appears in the above-indentified patent and that said Letters Patent is hereby corrected as shown below:

Col. 4, line 3, "-(ray" should read --$\gamma$-ray--.

Col. 5, line 12, "$\gamma$-(ray" should read --$\gamma$-ray--; and
line 24, "103-106" should read --$10^3$-$10^6$--.

Signed and Sealed this

Tenth Day of August, 1999

Attest:

Attesting Officer

Q. TODD DICKINSON

Acting Commissioner of Patents and Trademarks